US012409758B2

(12) United States Patent
Wedding et al.

(10) Patent No.: US 12,409,758 B2
(45) Date of Patent: Sep. 9, 2025

(54) CONTROL UNIT FOR AN ELECTRIC POWER TRANSMISSION SYSTEM (71) Applicant: VOLVO TRUCK CORPORATION, Gothenburg (SE)

(72) Inventors: Christoffer Wedding, Gothenburg (SE); Andreas Stockman, Västra Frölunda (SE); Emil Sjunnesson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 331 days.

(21) Appl. No.: 17/597,557

(22) PCT Filed: Jul. 11, 2019

(86) PCT No.: PCT/EP2019/068728
§ 371 (c)(1),
(2) Date: Jan. 11, 2022

(87) PCT Pub. No.: WO2021/004639
PCT Pub. Date: Jan. 14, 2021

(65) Prior Publication Data
US 2022/0258649 A1 Aug. 18, 2022

(51) Int. Cl.
*B60L 58/40* (2019.01)
*B60L 1/00* (2006.01)
*B60L 53/22* (2019.01)

(52) U.S. Cl.
CPC .............. *B60L 58/40* (2019.02); *B60L 1/006* (2013.01); *B60L 53/22* (2019.02);
(Continued)

(58) Field of Classification Search
CPC .......... B60L 58/40; B60L 1/006; B60L 53/22; B60L 2200/36; B60L 2200/40; Y02T 10/72
See application file for complete search history.

(56) References Cited

U.S. PATENT DOCUMENTS 5,548,200 A * 8/1996 Nor .................. B60L 53/11
320/132
5,642,270 A * 6/1997 Green .................. B60L 53/11
363/17
(Continued)

FOREIGN PATENT DOCUMENTS

CN 103660967 A 3/2014
CN 104025420 A 9/2014
(Continued)

OTHER PUBLICATIONS

International Search Report and Written Opinion dated Mar. 31, 2020 in corresponding International PCT Application No. PCT/EP2019/068728, 12 pages.
(Continued)

*Primary Examiner* — Frank B Vanaman
(74) *Attorney, Agent, or Firm* — Venable LLP; Jeffri A. Kaminski (57) ABSTRACT

A control unit for an electric power transmission system is provided. The electric power transmission system includes the control unit, an energy storage system for storing electrical energy and at least one electrical power take-off interface for connecting to an external power load. The at least one electrical power take-off interface is connected to the energy storage system in a way allowing energy transfer to the external power load. The control unit is configured to perform the following operations:—receiving information about an upcoming current increase for energy supply via the at least one electrical power take-off interface to the external power load,—configuring the at least one electrical power take-off interface to be supplied with energy from the energy storage system, and—controlling the energy supply to the external power load from the energy storage system (Continued)

via the at least one electrical power take-off interface while applying a current limitation to the supplied energy.

11 Claims, 3 Drawing Sheets

(52) U.S. Cl.
CPC ....... *B60L 2200/36* (2013.01); *B60L 2200/40* (2013.01); *B60L 2210/40* (2013.01)

(56) References Cited

U.S. PATENT DOCUMENTS

| | | | | |
|---|---|---|---|---|
| 5,725,062 | A * | 3/1998 | Fronek | B60L 8/00 |
| | | | | 180/2.2 |
| 2005/0109550 | A1 * | 5/2005 | Buglione | B60K 6/48 |
| | | | | 180/65.25 |
| 2007/0138986 | A1 * | 6/2007 | Kutsuna | B60K 6/365 |
| | | | | 318/400.21 |
| 2008/0169651 | A1 * | 7/2008 | Oyobe | B60L 7/14 |
| | | | | 307/35 |
| 2009/0166108 | A1 * | 7/2009 | Gross | F02B 63/04 |
| | | | | 180/65.21 |
| 2010/0045220 | A1 * | 2/2010 | Yamada | B60W 10/06 |
| | | | | 318/400.15 |
| 2010/0133900 | A1 | 6/2010 | King | |
| 2013/0057200 | A1 * | 3/2013 | Potts | H02J 50/12 |
| | | | | 320/107 |
| 2013/0200846 | A1 * | 8/2013 | Ang | B60L 1/003 |
| | | | | 320/109 |
| 2014/0225437 | A1 * | 8/2014 | Mizuno | H02J 9/06 |
| | | | | 307/66 |
| 2015/0112522 | A1 | 4/2015 | Iang et al. | |
| 2016/0001675 | A1 | 1/2016 | Kazuno et al. | |
| 2016/0152151 | A1 * | 6/2016 | Yang | B60L 58/27 |
| | | | | 320/109 |
| 2016/0236586 | A1 | 8/2016 | Soo et al. | |
| 2019/0291594 | A1 | 9/2019 | Li et al. | |

FOREIGN PATENT DOCUMENTS

| | | |
|---|---|---|
| CN | 105882643 A | 8/2016 |
| CN | 106873748 A | 6/2017 |
| EP | 2711233 A2 | 3/2014 |
| JP | H1159293 A | 3/1999 |
| JP | 2000023380 A | 1/2000 |
| JP | 2018046597 A | 3/2018 |

OTHER PUBLICATIONS

International Preliminary Report on Patentability dated Sep. 16, 2021 in corresponding International PCT Application No. PCT/EP2019/068728, 8 pages.

Chinese Office Action dated Apr. 1, 2024 in corresponding Chinese Patent Application No. 201980098265.0, 18 pages.

* cited by examiner

CONTROL UNIT FOR AN ELECTRIC POWER TRANSMISSION SYSTEM

CROSS-REFERENCE TO RELATED APPLICATIONS

This application is a U.S. National Stage application of PCT/EP2019/068728, filed Jul. 11, 2019, and published on Jan. 14, 2021, as WO 2021/004639 A1, all of which is hereby incorporated by reference in its entirety.

TECHNICAL FIELD

The invention relates to a control unit for an electric power transmission system to be comprised in a vehicle or vessel. The invention also relates to an electric power transmission system comprising the control unit and to a vehicle or vessel comprising the control unit or the electric power transmission system. The invention further relates to a method to be performed by a control unit for controlling an electric power transmission system.

The invention can be applied in any type of hybrid vehicles or electrical vehicles, such as partly or fully electrical vehicles. Although the invention mainly is described with respect to an electrical truck, the invention is not restricted to this particular vehicle, but may also be used in other hybrid or electrical vehicles such as electrical working machines, electrical construction equipment, and electrical buses. The invention may also be applied in several different types of electrical working machines e.g. wheel loaders, articulated haulers, dump trucks, excavators, fire trucks, refrigerated trucks and backhoe loaders etc. The invention may also be applied in a vessel, e.g. a ship.

BACKGROUND

In the field of electrical charging systems and electrical propulsion systems for vehicles, such as electrical vehicles, there are several different configurations for storing of electrical energy on-board of the vehicle and for providing propulsion to the vehicle by converting electrical energy to electrical power. Typically, the energy storage system, commonly abbreviated as ESS, has a battery connected to an electrical machine for providing or absorbing electrical power as required by the system. Moreover, the energy storage system is generally arranged at a suitable location in the vehicle so as to ensure that the battery can be discharged and charged in an appropriate manner in terms of efficiency and safety. By way of example, such batteries are often rechargeable batteries and typically include a number of battery cells that may be connected in series and/or in parallel forming a complete battery pack system for the vehicle.

In these types of systems, charging of batteries are frequently performed by connecting the vehicle to an external electrical network when the vehicle is at stand still, e.g. an external line voltage static supply, such as a three-phase 400 volts static AC grid supply by means of an on-board or off-board battery charger. In this manner, current is transferred from the external electrical network to the batteries on board the vehicle. In connection with charging of the batteries, it is desirable to ensure adequate solutions for supply of electrical power between various types of electrical equipment, such as the rechargeable batteries and the external electrical network.

With the increasing development in electrical propulsion system and on-board electrical energy storage systems, such as rechargeable batteries, a number of opportunities have also arisen for allowing one or more external power loads to operate with support from the electrical energy storage system.

When starting an external power load, or changing its way of operation, there is a risk that a current increase may occur. This may in turn pose a risk for damage of for example electrical applications, electrical components and/or wiring of the vehicle or vessel. Thus, it is desirable to further improve the electrical system of the vehicle or vessel, such as the partly or fully electrical vehicle or vessel, to meet the demands of such situations.

SUMMARY

An object of the invention is to provide an improved control unit and an improved method for an electric power transmission system, to be comprised in a vehicle or vessel, which is configured to meet the demands of a situation, in which an external power load is started or its way of operation changed. The object is at least partly achieved by a control unit and a method.

According to a first aspect of the invention, there is provided a control unit for an electric power transmission system to be comprised in a vehicle or vessel. The electric power transmission system comprises the control unit, an energy storage system for storing electrical energy and at least one electrical power take-off interface for connecting to an external power load. The at least one electrical power take-off interface is connected to, or connectable to, the energy storage system in a way allowing energy transfer to the external power load. The control unit is configured to perform the following operations:

receiving information about an upcoming current increase for energy supply via the at least one electrical power take-off interface to the external power load, configuring the at least one electrical power take-off interface to be supplied with energy from the energy storage system, and controlling the energy supply to the external power load from the energy storage system via the at least one electrical power take-off interface while applying a current limitation to the supplied energy.

The at least one electrical power take-off interface is directly or indirectly connected to, or connectable to, the energy storage system in a way allowing energy transfer to the external power load. The at least one electrical power take-off interface and the energy storage system may thereby be connected via a number of other components as described herein.

Further, the at least one electrical power take-off interface is assumed to be directly or indirectly connected to, or connectable to, an external power supply grid, e.g. via a charging interface, in a way allowing energy transfer. Hence, it is assumed that the external power load is connected to, or connectable to, the external power grid in a way allowing energy transfer.

When starting the external power load, or changing its way of operation, there is a risk that a current increase may occur in the energy supplied via the electrical power take-off interface to the external power load. The current increase may be sudden and/or large. It may e.g. be a transient. The term "large" may in this context mean that the current increase is too large for the components of the electric power transmission system to handle.

The current increase may in turn pose a risk for damage of for example electrical applications, electrical components and/or wiring of the vehicle or vessel. Therefore, it is desirable that the control unit is made aware of the upcoming current increase by receiving information that it is to happen. The information may be sent from the external power load as a signal, e.g. as a Start Request. The term "current increase" as used herein also covers the case that the energy need of the external power load is ramped up too quickly or is stepped up.

After having received information about the current increase, the control unit is configured to control the electric power transmission system in such a way that the electrical power take-off interface is set up to be supplied by energy from the energy storage system, e.g. instead of being supplied from the external power supply grid. This makes it possible to apply a current limitation to the energy supplied to the external power load. Hence, the configuring may include switching the energy source to the energy storage system. This may be obtained by changing one or more switches or relays of the electric power transmission system. Alternatively, if the external power load is inoperative, the configuring may include arranging the electric power transmission system, such that energy will be taken from the energy storage system.

By supplying the energy from the energy storage system with applied current limitation, the risk of having too high currents is reduced or preferably avoided. Thereby the risk for damage of for example electrical applications, electrical components and/or wiring of the vehicle or vessel is also reduced or preferably avoided.

By supplying the energy from the energy storage system, forming a part of the electric power transmission system of the vehicle or vessel, a better control of the supplied energy is possible, e.g. as compared to energy supplied from the external power supply grid.

This makes it is possible to allow the external power load to make a gentle start, which may be advantageous for the external power supply grid. In addition, it may be beneficial for the motor of the external power load.

The control unit is generally an electronic control unit. The control unit is typically arranged to control one, more or possibly all components of the electric power electrical power take-off interface, abbreviated as ePTO interface. In addition, or alternatively, the control unit is typically configured to communicate with the external power supply grid and/or the external power load.

The control unit may include a microprocessor, microcontroller, programmable digital signal processor or another programmable device. Thus, the control unit comprises electronic circuits and connections as well as processing circuitry such that the control unit can communicate with different parts of the electric power transmission system and any other parts in need of being operated in order to provide the functions of the example embodiments. Depending on the type of control unit and location of the control unit, the control unit may also be configured to communicate with other parts of the vehicle such as the electrical machines, brakes, suspension, the clutch, transmission and further electrical auxiliary devices, e.g. the air conditioning system, in order to at least partly operate the vehicle. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transitory memory for storing computer program code and data upon. Thus, the control unit may be embodied by many different constructions.

In other words, the control functionality of the example embodiments of the electric power transmission system may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While example embodiments including the electric power transmission system described herein can include a control unit being an integral part thereof, it is also possible that the control unit may be a separate part of the vehicle, and/or arranged remote from the electric power transmission system and in communication with the electric power transmission system.

The electric power transmission system may be a part of an overall vehicle electrical system. Typically, the electric power transmission system is part of a traction voltage system of a vehicle. By way of example, the electric power transmission system may be an integral part of an electrical propulsion system. However, the electric power transmission system may likewise be a separate system in communication or connected to the electrical propulsion system.

The example embodiments disclosed herein are particularly useful for vehicles or vessels such as electrical, including partly and fully electrical, hybrid electrical, e.g. plug-in hybrid electrical, or any other type of electrical vehicle or vessel. Electrical vehicles and vessels are provided with electrical machine(s) and generally an energy storage system such as a battery pack system. The energy storage system is typically configured to provide power to the electrical machine, thereby providing propulsion for the vehicle or vessel and also to power any other types of external electrical loads, e.g. in various types of construction equipment and other equipment.

The electrical power take-off interface is configured to provide electrical power to the external power load. The electrical power take-off interface may be of DC type or AC type. A DC electrical power take-off interface, abbreviated DCePTO interface, is configured to provide direct current, abbreviated DC, to the external power load. An AC electrical power take-off interface, abbreviated ACePTO interface, is configured to provide alternating current, abbreviated AC, to the external power load. The electric power transmission system may comprise one or more electrical power take-off interfaces, of DC type, of AC type or of both types.

The energy storage system is typically a DC electrical power source. By way of example, the energy storage system is a battery pack system, i.e. a system of interconnected battery packs. However, the DC electrical power source may also be provided in the form of an onboard fuel cell system.

The term external power load as used herein refers to an electrical power load, and is typically an external type of a vehicle load, such as electrical auxiliaries. One example of an external electrical power load is a so called "body-builder" accessory for powering "body-builder equipment". The term "body-builder equipment" generally refers to a piece of equipment which is carried, permanently or not, by the vehicle or vessel and may include a trash compactor, a cargo refrigerating unit, a dump body, a crane, a ladder, etc.

The current limitation may be applied by a separate current limiting component, e.g. located in the traction voltage system. Such a component should in that case desirably be adapted to charging standards for the energy storage system. This may be tricky and come at an additional cost.

As an alternative or a complement, the current limitation may be applied by means of a bidirectional DC/AC converter comprised in the electric power transmission system. The bidirectional DC/AC converter is directly or indirectly connected to the energy storage system and to the at least one electrical power take-off interface. The bidirectional DC/AC converter is configured to either allow energy to flow from the energy storage system to the at least one electrical power take-off interface or to allow energy to flow from the external power supply grid to the energy storage system. Applying the current limitation by means of the bidirectional DC/AC converter may often be preferable, since the bidirectional DC/AC converter in that case may form part of the electric power transmission system, wherein it is used also for other purposes. Hence, no separate current limiting component would be needed. Further, the bidirectional DC/AC converter is adapted to charging standards for the energy storage system. The bidirectional DC/AC converter is further described below.

The electric power transmission system may further comprise a charging interface for connecting to an external power supply grid, the at least one electrical power take-off interface being connected to or connectable to the charging interface in a way allowing energy transfer. In that case the control unit may further be configured to perform the following operations:
  determining a stability status of the current supplied from the energy storage system via the at least one electrical power take-off interface while applying the current limitation, and
  evaluating the stability status to decide whether to supply the energy via the at least one electrical power take-off interface from the energy storage system or from the external power supply grid.

It is further beneficial if the control unit has information about current limitations for the external power supply grid and/or the wiring of the vehicle or vessel.

The stability status of the current is determined while current is being supplied from the energy storage system via the at least one electrical power take-off interface. Thereby current limitation is applied. The stability status may e.g. be determined as "stable" or "unstable".

If the stability status of the current is evaluated as unstable, the control unit may be configured to perform the following operation:
  controlling the energy supply to continue supply energy from the energy storage system via the at least one electrical power take-off interface to the external power load.

In that case, the risk of a high current and/or a sudden current increase is still high, and it is hence preferred to continue supplying energy from the energy storage system, such that the current limitation may still be applied, e.g. the current limitation provided in the above-mentioned bidirectional DC/AC converter.

If the stability status of the current is evaluated as stable, the control unit may be configured to perform the following operation:
  switching to the external power supply grid for supplying energy from the external power supply grid via the at least one electrical power take-off interface to the external power load.

In that case, the risk of a high current is low and it is thus acceptable to supply energy from the external power supply grid, although there may in that case be an absence of possible current limitation.

If switching to the external power supply grid, the control unit may further be configured to perform the following operation:
  using information derivable from the external power supply grid for synchronizing electric characteristics of the energy supplied via the at least one electrical power take-off interface to the external power load before or while switching to the external power supply grid.

By way of example, the electrical characteristics may be indicative of any one of an amplitude, a frequency and a phase angle of the voltage or current from the external power supply grid. Thereby the electrical characteristics of the energy supplied from the energy storage system can be synchronized with the electrical characteristics of the energy being supplied from the external power supply grid, which helps to make a smooth transfer of energy source.

In case the electric power transmission system further comprises the above-mentioned charging interface, the control unit may further be configured to perform the following operation:
  controlling the energy supply via the at least one electrical power take-off interface to the external power load during normal operation conditions.

Normal operation conditions of the external power load prevail when the external power load operate in a normal way, thus forming a steady state situation for the external power load. This may e.g. be the case before the above-mentioned current increase occurs. The current increase may then occur due to that the external power load changes its way of operation, e.g. by starting up a part of the external power load hitherto not used.

According to a second aspect of the invention, there is provided an electric power transmission system of a vehicle or vessel. The electric power transmission system comprises a control unit as described herein, an energy storage system for storing electrical energy, and at least one electrical power take-off interface for connecting to an external power load. The at least one electrical power take-off interface is directly or indirectly connected to the energy storage system in a way allowing energy transfer. The electric power transmission system is configured to perform the following operations under control by the control unit:
  receiving information about an upcoming current increase for energy supply via the at least one electrical power take-off interface to the external power load,
  configuring the at least one electrical power take-off interface to be supplied with energy from the energy storage system, and
  controlling the energy supply to the external power load from the energy storage system via the at least one electrical power take-off interface while applying a current limitation.

The electric power transmission system, the control unit, the energy storage system, the electrical power take-off interface, how to apply current limitation and other details are described above in conjunction with the first aspect of the invention.

Effects and features of the second aspect of the invention are largely analogous to those described above in connection with the first aspect.

The electric power transmission system may further comprise a bidirectional power system connected to the energy storage system, the bidirectional power system comprising a bidirectional DC/AC converter for power conversion, the bidirectional DC/AC converter being directly or indirectly connected to the energy storage system, a charging interface for connecting to an external power supply grid, the above-described at least one electrical power take-off interface for connecting to an external power load and, as an option, a junction unit connected to the bidirectional DC/AC converter.

If there is a junction unit, the charging interface may be comprised in the junction unit. Further, one or more of the electrical power take-off interfaces may be comprised in the junction unit, typically an ACePTO, please see description thereof above.

The bidirectional power system is configured to either allow energy to flow from the energy storage system to the at least one electrical power take-off interface or to allow energy to flow from the external power supply grid to the energy storage system.

The bidirectional DC/AC converter, the charging interface and the at least one electrical power take-off interface are described above in conjunction with the first aspect of the invention. The control unit is configured to control operation of the bidirectional power system and/or the operation of the electric power transmission system.

In order to connect different types of electrical equipment in a vehicle in a reliable and secure manner, some systems may comprise the above-mentioned optional junction unit. A junction unit is an electrical device for housing several different electrical connections to protect the connections and provide a safety barrier. In particular, some vehicle electrical charging systems have a junction unit arranged between the rechargeable batteries and the charging interface.

The bidirectional power system is arranged to transfer electrical power between the ESS, the charging interface and the ePTO interface. Hence, the bidirectional power system is a system arranged for directing power in various directions and to various interfaces, while maintaining an adequate level of reliability and safety during use thereof. In particular, the bidirectional power system is configured to direct electrical power from the ESS to the ePTO interface. In addition, the bidirectional power system is configured to direct electrical power from the charging interface to the ePTO interface. Further, the bidirectional power system is configured to direct electrical power from the charging interface to the ESS. Still further, the bidirectional power system is configured to direct electrical power from ESS to the charging interface.

To this end, the electric power transmission system according to the example embodiments may eliminate, or at least reduce, the need of manually connecting/disconnecting the external power load when the vehicle needs to be charged. Moreover, it is believed that the example embodiments of the invention allow for increased possibilities for adding third party equipment powered by the ESS. Further, the example embodiments provide for a seamless transmission of power. In particular, the example embodiments provide for a seamless transmission of power to the ePTO when utilizing the external power supply grid to power the external power load via the ePTO interface.

The bidirectional DC/AC converter is for example an inverter configured to provide a two way power flow. The bidirectional DC/AC converter is configured both for DC to AC conversion taking power from the battery and for AC to DC conversion for charging the battery. The bidirectional DC/AC converter can be provided in several different configurations.

The electric power transmission system comprises the control unit arranged to operate the bidirectional power system. The control unit may be an integral part of an existing electronic control unit (ECU) arranged onboard the vehicle or vessel.

According to a third aspect of the present invention, there is provided a vehicle or vessel comprising a control unit or an electric power transmission system as described herein.

The vehicle may be an electrical, a hybrid, such as a plug-in hybrid, or any other type of vehicle or vessel. Thus, the vehicle or vessel may be a fully electrical or a partly electrical vehicle or vessel. The vehicle or vessel typically comprises at least an electrical machine, wherein the energy storage system provides power to the electrical machine for providing propulsion for the vehicle. Hence, the vehicle or vessel typically comprises a traction voltage system. In addition, the vehicle or vessel typically comprises an electrical propulsion system.

Effects and features of the third aspect of the invention are largely analogous to those described above in connection with the first aspect.

According to a fourth aspect of the present invention, there is provided a method for controlling an electric power transmission system to be performed by a control unit, the electric power transmission system being comprised in a vehicle or vessel. The electric power transmission system comprises the control unit, an energy storage system for storing electrical energy and at least one electrical power take-off interface for connecting to an external power load, the at least one electrical power take-off interface being connected to the energy storage system in a way allowing energy transfer.

The method comprises:
  receiving information about an upcoming current increase for energy supply via the at least one electrical power take-off interface to the external power load,
  configuring the at least one electrical power take-off interface to be supplied with energy from the energy storage system, and
  controlling the energy supply to the external power load from the energy storage system via the at least one electrical power take-off interface while applying a current limitation.

In case the electric power transmission system further comprises a charging interface for connecting to an external power supply grid, the method may further comprise:

determining a stability status of the energy supplied from the energy storage system via the at least one electrical power take-off interface while applying the current limitation, and     evaluating the stability status to decide about whether to continue supplying energy from the energy storage system or to switch to supply energy from the external power supply grid.

The stability status is determined while current is being supplied from the energy storage system via the at least one electrical power take-off interface. Thereby current limitation is applied.

If the stability status is evaluated as unstable, the method may further comprise:

controlling the energy supply to continue to supply energy from the energy storage system via the at least one electrical power take-off interface to the external power load.

If the stability status is evaluated as stable, the method may further comprise:

switching to the external power supply grid for supplying energy via the at least one electrical power take-off interface to the external power load.

If switching to the external power supply grid, the method may further comprise:

using information derivable from the external power supply grid for synchronizing electric characteristics of the energy supplied via the at least one electrical power take-off interface to the external power load before or while changing to the external power supply grid.

In case the electric power transmission system further comprises a charging interface for connecting to the external power supply grid and the at least one electrical power take-off interface may be connected to the charging interface in a way allowing energy transfer, as mentioned above, the method may further comprise:

controlling the energy supply via the at least one electrical power take-off interface to the external power load during normal operation conditions.

This step may be performed before the current increase occurs and/or after switching to the external power supply grid, once the current is stable again.

Effects and features of the fourth aspect of the invention are largely analogous to those described above in connection with the first aspect. The systems, components and parts described above in conjunction with the first to third aspects will not be described again.

The method is suitably performed by the control unit or the electric power transmission system according to the invention and as described herein.

According to a fifth aspect of the present invention, there is provided a computer program comprising program code means for performing the steps of any one of the embodiments of the fourth aspect when the program is run on a computer.

According to a sixth aspect of the present invention, there is provided a computer readable medium carrying a computer program comprising program means for performing the steps of any one of the embodiments of the fourth aspect when the program is run on a computer.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The same reference characters refer to the same elements throughout the description.

Figure 1:
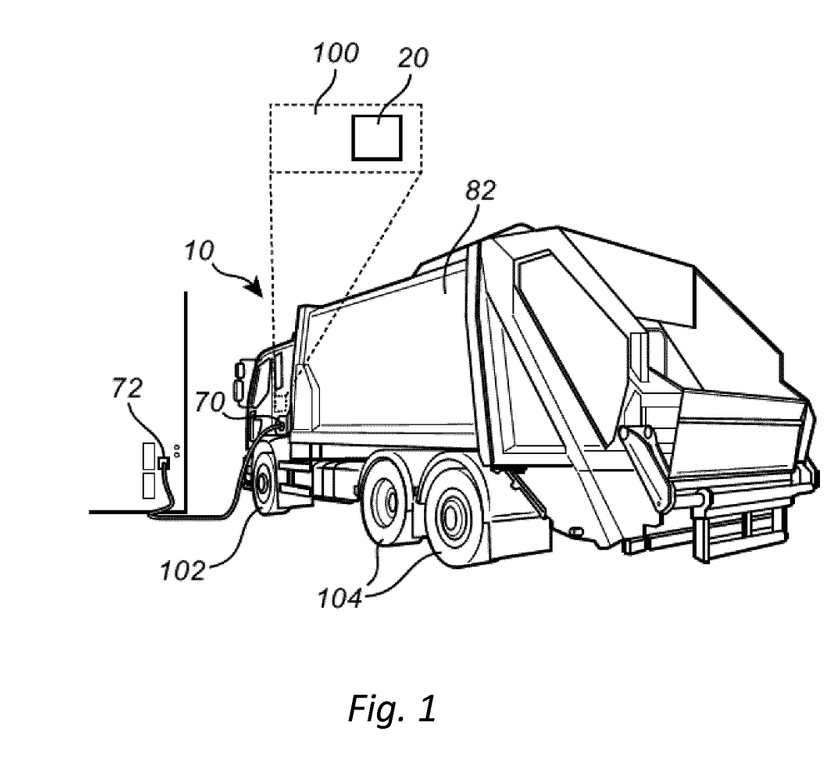
FIG. 1 is a perspective side view of a vehicle in the form an electrical truck according to an example embodiment of the invention.

FIG. 1 illustrates a vehicle in the form of an electrical vehicle, in particular an electrical truck 10. The electrical truck 10 comprises an electrical propulsion system 100 for providing propulsion to the electrical truck. In this example, the electrical truck is a refuse collection vehicle, also known as a dustcart or garbage truck. The electrical propulsion system 100 is arranged to provide power to one or several ground engaging members, such as a pair of wheels 102, or a number of pair of wheels 104. The electrical propulsion system including an electrical machine is configured for driving the pair of ground engaging members 102, 104 in the form of wheels. Optionally, the electrical propulsions system comprises a transmission for transmitting a rotational movement from the electrical machine(s) to a propulsion shaft, sometimes denoted as the drive shaft. The propulsion shaft connects the transmission to the pair of wheel 102, 104. Furthermore, although not shown, the electrical machine is typically coupled to the transmission by a clutch. Besides providing propulsion to the vehicle, the electrical propulsion system or parts of the system can manage other electronic functions of the vehicle. Moreover, the vehicle 10 comprises an electric power transmission system 20. The electric power transmission system 20 is here an integral part of the electrical propulsion system 100. The electric power transmission system 20 can be incorporated and installed in a truck as illustrated in FIG. 1, or in any other type of partly or fully electrical vehicle or vessel. The electric power transmission system 20 may likewise be connected to the electrical propulsion system. The electric power transmission system 20 may likewise be a separate part of the vehicle.

As depicted in FIG. 1, the electric power transmission system 20 comprises a charging interface 70 for connecting to an external power supply grid 72, such as a charging station. The electric power transmission system 20 can be configured to connect either to a single-, two- or three-phase power supply network. The charging interface is typically a 400 VAC interface configured to import energy from a residential grid.

Figure 2:
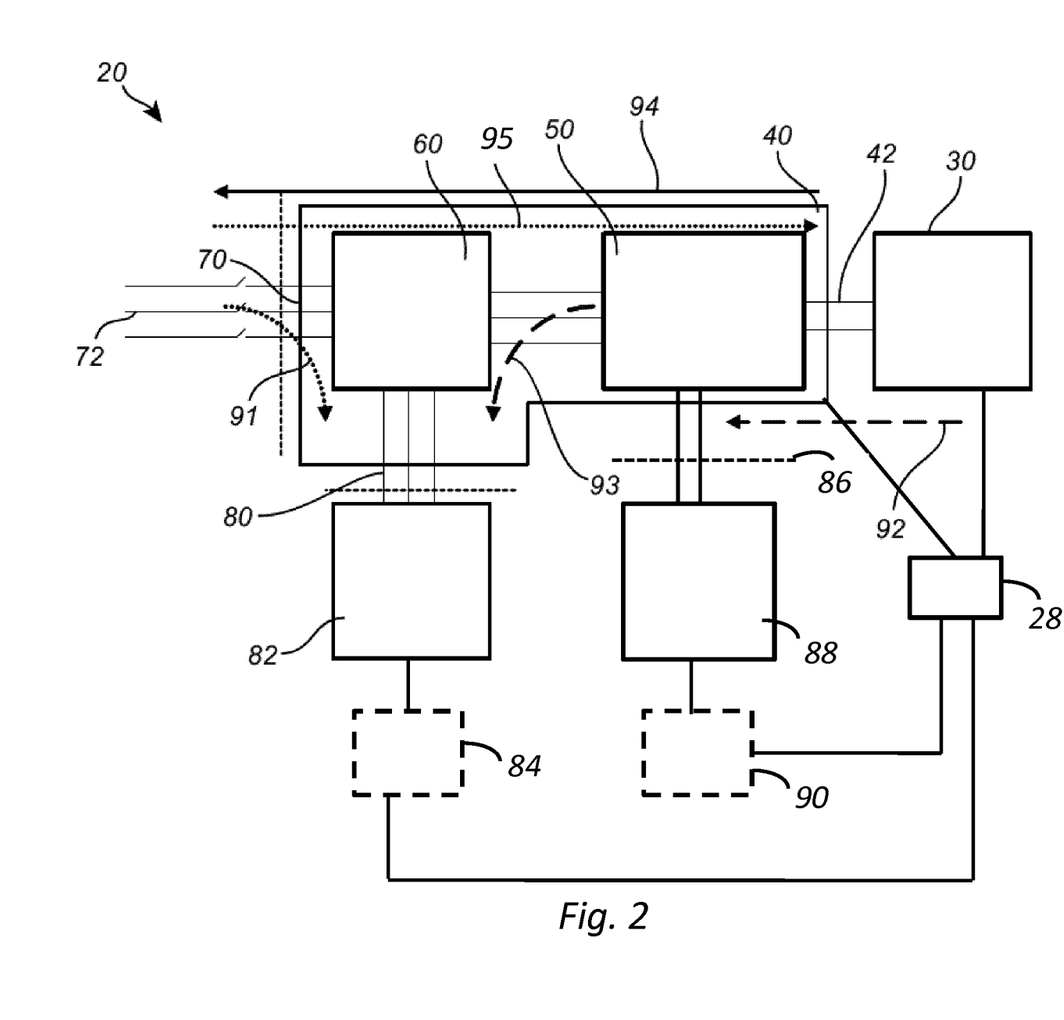
FIG. 2 schematically illustrates components of an electric power transmission system for a vehicle or vessel according to one example embodiment of the invention.

One example embodiment of an electric power transmission system according to the invention is illustrated in FIG. 2. In this figure, three parallel lines are used to denote possible transfer of AC energy, two parallel lines are used to denote possible transfer of DC energy and a single line is used to denote routes for communication. The communication may occur hardwired or wirelessly. The arrows 91, 92, 93, 94 and 95 indicate a number of possible energy transfer directions, which are described below.

The electric power transmission system 20 comprises an onboard energy storage system, ESS, 30. The onboard ESS 30 is here illustrated as a DC onboard energy storage system, such as a battery pack system comprising a number of battery packs. The battery pack system is arranged to provide power to one or more electrical machines (not shown) arranged for providing propulsion for the electrical truck 10.

The ESS 30 may also be arranged to power one or more internal auxiliary components commonly denoted as an auxiliary system of the vehicle, e.g. an air conditioning system (although not shown). In addition, the onboard energy storage system 30 is configured to power an external power load 82, 88, i.e. an external device requiring electrical energy to operate or to perform an operation. One example of an external power load is a body-builder equipment such as a crane. Another example of an external power load is an external electrical equipment connected to the vehicle. In FIG. 1, the external power load is exemplified as a load body of a refuse collection truck. The load body is mounted on the chassis of the vehicle and arranged to receive collected refuse. The load body is electrically powered via the electric power transmission system 20.

Moreover, in the illustrated embodiment, the electric power transmission system 20 comprises a bidirectional power system 40 connected to the energy storage system 30.

The bidirectional power system 40 comprises a bidirectional DC/AC converter 50 for power conversion.

Further, the bidirectional power system 40 of the illustrated embodiment comprises as an option a junction unit 60. The junction unit is connected to the bidirectional DC/AC converter 50. In other words, the bidirectional DC/AC converter 50 is arranged in-between the junction unit 60 and the ESS 30.

The junction unit 60 comprises a charging interface 70 for connecting to the external power supply grid 72. In this example, the externally supplied power grid is an electrical AC grid static supply source, such as a commercial grid 400 VAC. The charging interface typically comprises a connector for connecting the vehicle to the external power grid static AC supply. By way of example, the charging interface comprises a connector such as a type 2 connector or an extended charging connector.

In addition, the junction unit 60 comprises an AC electrical power take-off (ACePTO) interface 80 for connecting to the external power load 82. It is thus assumed that the illustrated external power load 82 is an AC-driven external power load. The ePTO interface 80 typically comprises a connector for connecting the junction unit 60 to the external power load 82. By way of example, the ePTO interface comprises a connector such as a ring terminal, standard 3 phase outlet or other generic connector. As depicted in e.g. FIG. 1, the load body, i.e. the exemplary external power load 82, is connected to the ACePTO interface 80 and configured to be energy supplied by the ESS and/or the external power supply grid 72 via the electric power transmission system 20, as is also further described below. The transfer of energy to the ACePTO interface 80 is generally controlled by a control unit 28, e.g. an electronic control unit, ECU. As an option, there may be an AC communication interface unit 84 connected between the AC-driven external power load 82 and the control unit 28. Alternatively, the control unit 28 may connect directly to the AC-driven external power load 82.

As illustrated in FIG. 2, the junction unit 60 is electrically connected via the bidirectional DC/AC converter 50 to the ESS 30. In particular, the ESS 30 is connected to the bidirectional DC/AC converter 50 by an electrical connection 42. The electrical connection is adapted for transferring electrical energy. The bidirectional DC/AC converter is configured both for DC to AC conversion taking energy from the ESS and for AC to DC conversion for charging the ESS.

Accordingly, the junction unit 60 connects the ESS 30 via the bidirectional DC/AC converter 50 to the external power supply grid 72 via the charging interface 70. In addition, the junction unit 60 connects the ESS 30 via the bidirectional DC/AC converter 50 to the external power load 82 via the ACePTO 80. In other words, the bidirectional DC/AC converter 50 is arranged between the ESS 30 and the junction unit 60.

By this configuration of the bidirectional power system 40, the bidirectional power system is configured to set the electric power transmission system 20 in a number of operations. In this example embodiment, the operations include an ePTO first operation, in which energy is transferable from the energy storage system 30 to the ePTO interface via the bidirectional power system 40, an ePTO second operation, in which energy is transferable from the charging interface to the ePTO interface via the bidirectional power system, and a charging operation, in which energy is transferable from the charging interface to the energy storage system via the bidirectional power system 40. In FIG. 2, the arrows 91, 92, 93, 94 and 95 indicate a number of possible energy transfer directions provided by the electric power transmission system.

When the electric power transmission system 20 is in the ePTO first operation, the AC-driven external power load 82 receives energy from the onboard ESS 30 via the junction unit 60 of the bidirectional power system 40, which is configured to direct electrical energy from the onboard ESS 30 to the ACePTO interface 80. That is, electrical energy is transferred from the ESS 30 to the bidirectional DC/AC converter 50, as indicated by arrow 92, and then from the bidirectional DC/AC converter 50 through the junction unit 60 and to the ePTO interface 80, as indicated by arrow 93. The above operation of the electric power transmission system 20 is generally controlled by the control unit 28, which thus is connected to the ESS 30 and the bidirectional power system 40.

Further, when the electric power transmission system 20 is in the ePTO second operation, the external power load 82 receives energy from the external power supply grid 72 via the charging interface 70 and via the junction unit 60 of the bidirectional power system 40, which is also configured to direct electrical energy from the charging interface to the ACePTO interface 80. That is, electrical energy is transferred from the charging interface 70 to the ACePTO 80 interface through the junction unit 60, as indicated by arrow 91. The above operation of the electric power transmission system 20 is generally controlled by the control unit 28.

Moreover, when the electric power transmission system 20 is set in the charging operation, the onboard ESS 30 is charged by the external power supply grid 72. Thus, when the electric power transmission system 20 is set in the charging operation, the junction unit 60 is configured to direct supplied electrical energy from the external power supply grid 72 via the charging interface 70 and the junction unit 60 to the bidirectional DC/AC converter 50 and further to the onboard energy storage system 30, as also indicated by arrow 95. The above operation of the electric power transmission system 20 is generally controlled by the control unit 28.

Optionally, the bidirectional power system 40 is also configured to transfer energy from the energy storage system 30 to the charging interface 70 via the bidirectional power system, as indicated by arrow 94. Hence, the bidirectional power system 40 is arranged to operate the electric power transmission system 20 in an additional external energy supply operation, in which energy is transferred from the energy storage system 30 to the charging interface 70 via the bidirectional power system. In this manner, the ESS can be used to supply energy to the grid 72. The above operation of the electric power transmission system 20 is generally controlled by the control unit 28.

FIG. 2 further illustrates that the bidirectional power system 40 in addition to, or as an alternative to, the above-described AC electrical power take-off (ACePTO) interface 80 for connecting to the AC-driven external power load 82 may comprise a DC electrical power take-off (DCePTO) interface 86 for connecting to a DC-driven external power load 88. In that case, the DC electrical power take-off (DCePTO) interface 86 may be supplied from the ESS 30 via the bidirectional DC/AC converter 50, i.e. without passing the junction unit 60. As an option, there may be a DC communication interface unit 90 connected between the DC-driven external power load 88 and the control unit 28 or the control unit 28 may connect directly to the DC-driven external power load 88.

Figure 3:
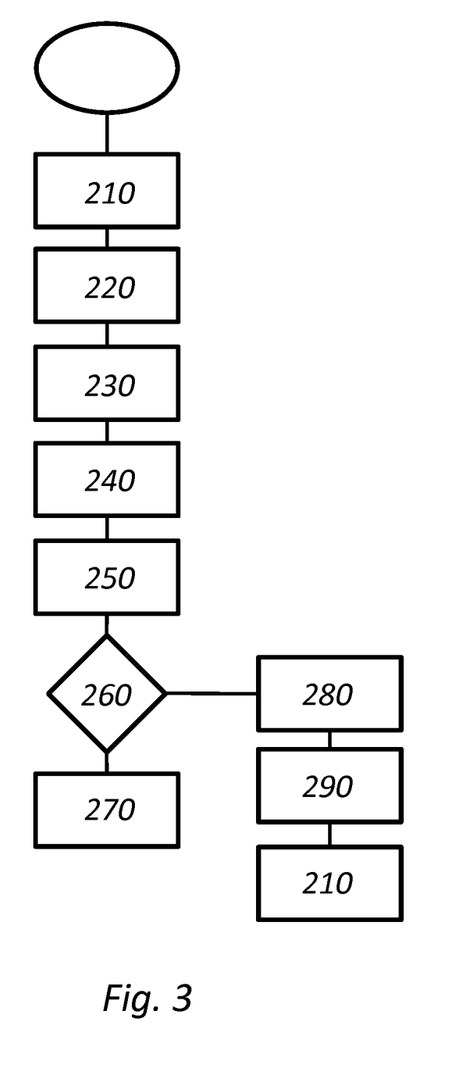
FIG. 3 schematically illustrates a flowchart of a method for controlling an electric power transmission system according to the invention.

FIG. 3 schematically illustrates a flowchart of a method 200 to be performed by a control unit 28 for controlling an electric power transmission system 20 comprised in a vehicle 1 or vessel, e.g. an embodiment of the electric power transmission system 28 as described herein. The electric power transmission system 20 comprises the control unit 28, an energy storage system 30 for storing electrical energy and at least one electrical power take-off interface 80, 86 for connecting to an external power load 82, 88, the at least one electrical power take-off interface 80, 86 being connected to the energy storage system 30 in a way allowing energy transfer.

The method 200 comprises:
 220: receiving information about an upcoming current increase for energy supply via the at least one electrical power take-off interface to the external power load,
 230: configuring the at least one electrical power take-off interface to be supplied with energy from the energy storage system, and
 240: controlling the energy supply to the external power load from the energy storage system via the at least one electrical power take-off interface while applying a current limitation.

The step of controlling 230 includes setting up the electric power transmission system 20 in such a way that energy can be supplied from the energy storage system via the at least one electrical power take-off interface to the external power load. This step may e.g. include setting switches in a position allowing this and/or configuring power electronics.

In case the electric power transmission system further comprises a charging interface 70 for connecting to an external power supply grid 72, the method 200 may further comprise:
 250: determining a stability status of the energy supplied from the energy storage system via the at least one electrical power take-off interface while applying the current limitation, and
 260: evaluating the stability status to decide about whether to continue supplying energy from the energy storage system 30 or to switch to supply energy from the external power supply grid 72.

Step 250 is performed while current is being supplied from the energy storage system via the at least one electrical power take-off interface. Thereby current limitation is applied.

If the stability status is evaluated as unstable, the method may further comprise:
 270: controlling the energy supply to continue to supply energy from the energy storage system 30 via the at least one electrical power take-off interface 80, 86 to the external power load 82, 88.

If the stability status is evaluated as stable, the method may further comprise:
 280: switching to the external power supply grid 72 for supplying energy via the at least one electrical power take-off interface 80, 86 to the external power load 82, 88.

If switching to the external power supply grid 72, the method 200 may further comprise:
 290: using information derivable from the external power supply grid 72 for synchronizing electric characteristics of the energy supplied via the at least one electrical power take-off interface 80, 86 to the external power load 82, 88 before or while changing to the external power supply grid 72.

In case the electric power transmission system 20 further comprises the charging interface 70 for connecting to the external power supply grid 72 and the at least one electrical power take-off interface 80, 86 may be connected to the charging interface 72 in a way allowing energy transfer, as mentioned above, the method may further comprise:
 210: controlling the energy supply via the at least one electrical power take-off interface to the external power load during normal operation conditions.

Step 210 may be performed before step 220 or after step 290.

It is to be understood that the present invention is not limited to the embodiments described above and illustrated in the drawings; rather, the skilled person will recognize that changes and modifications may be made within the scope of the appended claims. For example, although the present invention has mainly been described in relation to an electrical truck, the invention should be understood to be equally applicable for any type of electrical vehicle or vessel.

The invention claimed is:

1. A control unit for an electric power transmission system to be comprised in a vehicle or vessel, the electric power transmission system comprising the control unit, an energy storage system for storing electrical energy, a charging interface for connecting to an external power supply grid and at least one electrical power take-off interface for connecting to an external power load, the at least one electrical power take-off interface being connected to the energy storage system in a way allowing energy transfer to the external power load, the at least one electrical power take-off interface being connectable to the charging interface in a way allowing energy transfer, the control unit being configured to perform the following operations:

receiving information about an upcoming current increase for energy supply via the at least one electrical power take-off interface to the external power load, which information is sent from the external power load as a signal, configuring the at least one electrical power take-off interface to be supplied with energy from the energy storage system, and controlling the energy supply to the external power load from the energy storage system via the at least one electrical power take-off interface while applying a current limitation to the supplied energy, determining a stability status of the current supplied from the energy storage system via the at least one electrical power take-off interface while applying the current limitation, and evaluating the stability status to decide whether to supply the energy via the at least one electrical power take-off interface from the energy storage system or from the external power supply grid, and switching to the external power supply grid for supplying energy from the external power supply grid via the at least one electrical power take-off interface to the external power load if the stability status is evaluated as stable.

2. The control unit according to claim 1, wherein the control unit is configured to apply the current limitation by means of a bidirectional DC/AC converter comprised in the electric power transmission system and connected to the energy storage system.

3. The control unit according to claim 1, wherein the control unit further is configured to perform the following operation:

controlling the energy supply to continue supply energy from the energy storage system via the at least one electrical power take-off interface to the external power load, when the stability status is evaluated as unstable.

4. The control unit according to claim 1, wherein the control unit further is configured to perform the following operation:

using information, indicative of any one of an amplitude, a frequency and a phase angle of voltage or current, derivable from the external power supply grid for synchronizing electric characteristics of the energy supplied via the at least one electrical power take-off interface to the external power load before or while switching to the external power supply grid.

5. The control unit according to claim 1, wherein the at least one electrical power take-off interface is connected to the charging interface in a way allowing energy transfer, wherein the control unit further is configured to perform the following operation:

controlling the energy supply via the at least one electrical power take-off interface to the external power load during steady state operation conditions of the external power load.

6. The control unit according to claim 1, wherein the at least one electrical power take-off interface is an AC electrical power take-off interface and/or a DC electrical power take-off interface.

7. A vehicle or vessel comprising a control unit according to claim 1.

8. An electric power transmission system of a vehicle or vessel, the electric power transmission system comprising:
a control unit,
an energy storage system for storing electrical energy, and
at least one electrical power take-off interface for connecting to an external power load, the at least one electrical power take-off interface being connected to the energy storage system in a way allowing energy transfer, wherein the electric power transmission system is configured to perform the following operations under control by the control unit:

receiving information about an upcoming current increase for energy supply via the at least one electrical power take-off interface to the external power load, which information is sent from the external power load as a signal, configuring the at least one electrical power take-off interface to be supplied with energy from the energy storage system, and controlling the energy supply to the external power load from the energy storage system via the at least one electrical power take-off interface while applying a current limitation to the supplied energy, determining a stability status of the current supplied from the energy storage system via the at least one electrical power take-off interface while applying the current limitation, and evaluating the stability status to decide whether to supply the energy via the at least one electrical power take-off interface from the energy storage system or from an external power supply grid, and switching to the external power supply grid for supplying energy from the external power supply grid via the at least one electrical power take-off interface to the external power load if the stability status is evaluated as stable.

9. The electric power transmission system according to claim 8 further comprising a bidirectional power system connected to the energy storage system, the bidirectional power system comprising:

a bidirectional DC/AC converter for power conversion, the bidirectional DC/AC converter being connected to the energy storage system,
a charging interface for connecting to the external power supply grid,
the at least one electrical power take-off interface for connecting to the external power load, and
a junction unit connected to the bidirectional DC/AC converter.

10. A method for controlling an electric power transmission system to be performed by a control unit, the electric power transmission system being comprised in a vehicle or vessel, the electric power transmission system comprising the control unit, an energy storage system for storing electrical energy, a charging interface for connecting to an external power supply grid, and at least one electrical power take-off interface for connecting to an external power load, the at least one electrical power take-off interface being connected to the energy storage system in a way allowing energy transfer, the at least one electrical power take-off interface being connectable to the charging interface in a way allowing energy transfer, the method comprising:

receiving information about an upcoming current increase for energy supply via the at least one electrical power take-off interface to the external power load, which information is sent from the external power load as a signal, configuring the at least one electrical power take-off interface to be supplied with energy from the energy storage system, and controlling the energy supply to the external power load from the energy storage system via the at least one electrical power take-off interface while applying a current limitation, determining a stability status of the current supplied from the energy storage system via the at least one electrical power take-off interface while applying the current limitation, and evaluating the stability status to decide whether to supply the energy via the at least one electrical power take-off interface from the energy storage system or from the external power supply grid, and switching to the external power supply grid for supplying energy from the external power supply grid via the at least one electrical power take-off interface to the external power load if the stability status is evaluated as stable.

11. A non-transitory computer readable medium carrying a computer program for performing the steps of claim 10 when the program is run on a computer.

\* \* \* \* \*